United States Patent
Kojo

(10) Patent No.: US 8,666,607 B2
(45) Date of Patent: Mar. 4, 2014

(54) VEHICULAR STEERING CONTROL SYSTEM AND STEERING CONTROL METHOD

(75) Inventor: Takahiro Kojo, Gotenba (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 232 days.

(21) Appl. No.: 12/812,660

(22) PCT Filed: Apr. 6, 2009

(86) PCT No.: PCT/IB2009/005190
§ 371 (c)(1),
(2), (4) Date: Jul. 13, 2010

(87) PCT Pub. No.: WO2009/125271
PCT Pub. Date: Oct. 15, 2009

(65) Prior Publication Data
US 2011/0022268 A1 Jan. 27, 2011

(30) Foreign Application Priority Data
Apr. 7, 2008 (JP) ................. 2008-099298

(51) Int. Cl.
*B62D 6/00* (2006.01)
*B62D 5/00* (2006.01)
(52) U.S. Cl.
CPC ............... *B62D 5/003* (2013.01); *B62D 5/008* (2013.01)
USPC ................ 701/43; 701/41; 180/443; 180/444
(58) Field of Classification Search
CPC .................................................. B62D 5/008
See application file for complete search history.

(56) References Cited

U.S. PATENT DOCUMENTS

| 6,164,150 A | * | 12/2000 | Shindo et al. .......... 74/388 PS |
| 6,523,637 B1 | * | 2/2003 | Nakano et al. .......... 180/402 |
| 6,718,242 B1 | | 4/2004 | Mori et al. |
| 6,843,344 B2 | * | 1/2005 | Kodama et al. ............. 701/41 |
| 7,195,098 B2 | * | 3/2007 | Hidaka et al. ............. 180/446 |
| 2004/0222033 A1 | | 11/2004 | Kameya |
| 2005/0145433 A1 | * | 7/2005 | Akuta et al. ............... 180/443 |

FOREIGN PATENT DOCUMENTS

| DE | 3525912 A1 | 1/1986 |
| DE | 10 2004 009 522 A1 | 9/2005 |
| DE | 602 18 594 T2 | 11/2007 |
| EP | 1 334 897 | 8/2003 |

(Continued)

OTHER PUBLICATIONS

Office Action issued Jun. 14, 2011 in the corresponding Germany Application No. 11 2009 000 853.4 (with English Translation).

*Primary Examiner* — John R Olszewski
*Assistant Examiner* — Todd Melton
(74) *Attorney, Agent, or Firm* — Oblon, Spivak, McClelland, Maier & Neustadt, L.L.P.

(57) ABSTRACT

In a vehicle including a VGRS actuator capable of changing the steering transmission ratio by rotating an upper steering shaft and a lower steering shaft relative to each other, an ECU performs a lock releasing process when the VGRS motor is locked. In the process, an actual steering angle is calculated, and is compared with a lock release threshold value that is set in advance in view of the axial force applied to the lower steering shaft during steering. If the actual steering angle is equal to or smaller than the lock release threshold value, the ECU performs driving control of a lock mechanism so as to release the locked state of the VGRS motor.

13 Claims, 6 Drawing Sheets

(56) References Cited

FOREIGN PATENT DOCUMENTS

| | | |
|---|---|---|
| JP | 11 301507 | 11/1999 |
| JP | 2004 58787 | 2/2004 |
| JP | 2006 159992 | 6/2006 |
| JP | 2007 98968 | 4/2007 |
| WO | 2005 063547 | 7/2005 |

* cited by examiner

VEHICULAR STEERING CONTROL SYSTEM AND STEERING CONTROL METHOD

FIELD OF THE INVENTION

The invention relates to a steering control system of a vehicle installed with a device, such as VGRS (Variable Gear Ratio Steering), for making the steering transmission ratio variable, which has a function of placing an input shaft and an output shaft in a locked state in which the input and output shafts are unable to rotate relative to each other.

BACKGROUND OF THE INVENTION

As an example of the above type of system, a vehicular steering system, which is concerned with release of the locked state, is disclosed in Japanese Patent Application Publication No. 2007-98968 (JP-A-2007-98968). In the vehicular steering system as disclosed in JP-A-2007-98968, if the absolute value of the steering torque applied to the input shaft is kept larger than a specified value for a given period of time or longer, the locked state is not released even when conditions for releasing the locked state are satisfied. It is thus possible to accurately determine a condition where a motor or drive circuit operates at a high load, and appropriately release the locked state.

According to a technology as disclosed in Japanese Patent Application Publication No. 2004-58787 (JP-A-2004-58787), when a lock release condition for releasing the locked state based on a change of the steering angle or the rate of change of the steering angle is satisfied, the locked state is released at the time when a delay time set to be longer as the temperature decreases has elapsed.

If the steering torque, when used as a criterion of determination as to release of the locked state, is temporarily reduced, such as when the driver releases the steering wheel for a moment, the locked state may be erroneously released even in the presence of a load condition that requires the locked state to be maintained. In this case, the input shaft and the output shaft are highly likely to be controlled to the locked state again, and repeatedly switch between the locked state and the unlocked or released state, whereby the driver is likely to feel uncomfortable. Namely, the vehicular steering system as disclosed in JP-A-2007-98968 has a problem that the driveability may deteriorate, in connection with release of the locked state.

SUMMARY OF THE INVENTION

The present invention provides a vehicular steering control system and steering control method, which make it possible to release the locked state at appropriate times.

A first aspect of the invention is concerned with a steering control system of a vehicle. The vehicular steering control system includes driving force providing means capable of providing at least one of an input shaft and an output shaft that are involved in transmission of a steering input, with driving force for rotating the input shaft and the output shaft relative to each other, and locking means capable of placing the input shaft and the output shaft in a locked state in which the input shaft and the output shaft are unable to rotate relative to each other. The steering control system is characterized by including first control means for controlling the locking means so that the input shaft and the output shaft are placed in the locked state when a given lock condition based on a load condition of the driving force providing means is satisfied, acquiring means for acquiring an actual steering angle index value corresponding to an actual steering angle of the vehicle, and second control means for controlling the locking means so as to release the locked state according to the acquired actual steering angle index value.

The "input shaft" and "output shaft" according to the invention are rotatable shafts or shaft bodies involved in transmission of steering input applied to a steering system through, for example, manipulation of the steering wheel by the driver. While the input shaft is located upstream of the output shaft (for example, is located closer to the steering wheel), as viewed in the direction of transmission of the steering input, detailed arrangements of the input and output shafts are not limited, i.e., the input and output shafts may have any physical or mechanical forms, provided that the input and output shafts are rotatable relative to each other.

The rotational angle of the input shaft has a one-to-one relationship with the steering angle (e.g., the steering angle of the steering wheel) as an index value that specifies a degree of the steering input, no matter whether the steering wheel and the input shaft are directly coupled to each other, or a speed reducing means, shifting means, differential means, or other power transmitting means is interposed between the steering wheel and the input shaft. The rotational angle of the output shaft has a one-to-one relationship with an actual steering angle as an index value that specifies a degree of turning of steered wheels, no matter whether a speed reducing means, shifting means, differential means, any of various steering mechanisms, such as a rack-and-pinion mechanism and a bolt-and-nut type mechanism, or any other power transmitting means is interposed between the steered wheels and the output shaft.

The "driving force providing means" refers to a concept including all types of means capable of applying driving force (e.g., physical, mechanical, electrical or magnetic driving force, or a suitable combination of these driving forces) for rotating the input and output shafts relative to each other, to at least one of the input shaft and the output shaft, directly or indirectly via, for example, any speed reducing means, shifting means or differential means. For example, the driving force providing means may be in the form of any of various types of actuators including various motors or similar electric motors. In the vehicle according to this aspect of the invention, the steering transmission ratio as the ratio between the steering angle and the actual steering angle is made variable in steps, for example, between two values, or made continuously variable, according to a degree of relative rotation between the input shaft and the output shaft, which occurs due to provision of the driving force as described above.

The "locking means" refers to a concept including physical, mechanical, structural, electrical and magnetic means, and suitable combinations of these means, each capable of placing the input shaft and the output shaft in a locked state in which the input and output shafts are unable to rotate relative to each other (which will be expressed as "locking the input and output shafts" when appropriate). The structure or arrangement of the "locking means" is not limited at all as long as the locking means allows the input shaft and the output shaft to be placed in a selected one of at least the locked state and an unlocked state in which the locked state is released (or in which the relative rotation of the input and output shafts is permitted or made possible, and the steering transmission ratio can be varied).

During operation of the vehicular steering control system according to the invention, the locking means is controlled so as to lock the input shaft and the output shaft when a given lock condition or conditions is/are satisfied, by the first control means that may take the form of, for example, any of various processing units, such as ECU (Electronic Control Unit), various controllers and various computer systems, such as a microcomputer.

Here, the "lock condition" refers to a condition under which it is determined that the input shaft and the output shaft should be locked, based on a load condition of the driving force providing means. For example, the lock condition comprises a condition under which the driving force providing means is forced to operate in a region that exceeds its physical, mechanical, electrical or magnetic operating limit (e.g., the theoretical, substantial or actual maximum torque), or in a region around the operating limit, or a condition under which the driving force providing means is presumed to be forced to operate in such regions, when the input and output shaft are rotated relative to each other.

By locking the input and output shafts in the above manner, it may be possible to favorably prevent the occurrence of a situation where the steering performance of the vehicle significantly deteriorates, for example, a situation where the axial force directly or indirectly applied to the output shaft so as to turn the steered wheels exceeds the operating limit of the driving force providing means. On the other hand, it is desirable to release the locked state of the input and output shafts as soon as possible, in view of various effects associated with improvement of the steering performance, which would be provided by making the steering transmission ratio variable (for example, effects such as improvement of the vehicle turning ability which would be achieved by making the actual steering angle per unit steering angle relatively large in a low-speed region, or improvement of the steering stability which would be achieved by making the actual steering angle per unit steering angle relatively small in a high-speed region).

While the steering transmission ratio is variable, an operation to specify a load condition of the driving force providing means, or an operation to estimate or predict a load condition of the near future can be relatively easily performed, based on various controlled variables (e.g., steering torque, driving voltage, driving current, etc.) associated with the driving force providing means. However, once the input and output shafts are locked, it becomes practically difficult to highly accurately estimate a load condition of the driving force providing means after release of the locked state. Therefore, a margin of safety is often provided against release of the locked state, in order to protect the driving force providing means and ensure the least steering performance, or in order to prevent the occurrence of noise and vibrations and reduction of the driveability due to frequent switching between the locked state and the unlocked state. In this case, if the load condition is estimated according to the steering torque, an erroneous decision is likely to be made, for example, when the steering torque is reduced irrespective of the axial force applied to the output shaft, such as when the driver releases the steering wheel for a moment, and problems are likely to arise from frequent switching between the locked state and the unlocked state.

In the vehicular steering control system according to the first aspect of the invention, therefore, the actual steering angle index value corresponding to the actual steering angle is acquired by the acquiring means that may take the form of, for example, any of various control units, such as ECU, various controllers, and various computer systems, such as a microcomputer. Also, the second control means that may take the form of, for example, any of various control units, such as ECU, various controllers, and various computer systems, such as a microcomputer, controls the locking means so that the locked state is released according to the actual steering angle index value. Here, the "actual steering index value" refers to a concept comprising index values that are somewhat correlated with the actual steering angle, including, for example, the actual steering angle, steering angle, lateral acceleration of the vehicle, and various index values derived from these angles and lateral acceleration according to a certain algorithm or arithmetic expression.

The above-mentioned "acquisition" ("acquire") refers to a concept including all of the operations for specifying some value (e.g., actual steering angle index value) in any form, which operations include, for example, calculation, derivation and identification, in addition to directly or indirectly receiving a result of detection or a result of calculation from a detecting means or a calculating means. The acquiring means may acquire the actual steering angle index value by receiving information of the actual steering angle detected by, for example, an actual steering angle sensor, or by taking a measure of, for example, converting the steering angle detected by a steering angle sensor into the actual steering angle, or by performing an additional operation or computation on the actual steering angle received or obtained through the conversion.

What is important here is that the actual steering angle used in the steering control system according to the first aspect of the invention can be used alternatively as an index value representing the axial force applied to the output shaft, by taking a preliminary measure of, for example, specifying characteristics of changes in the axial force with respect to changes in the actual steering force for each vehicle running condition, empirically, or theoretically, or based on a simulation, or the like. For example, the relationship between the axial force and the actual steering angle may be mapped and stored in a suitable storage means, or may be derived on each specific occasion according to an arithmetic expression(s) that represents the relationship in numerical form. Namely, the steering angle used in the steering control system of this aspect of the invention is handled or processed substantially equally or in the same manner as the axial force of the output shaft. Similarly, the actual steering angle index value may alternatively represent the axial force applied to the output shaft during steering.

Thus, with the vehicular steering control system according to the first aspect of the invention, it is possible to release the locked state of the input and output shafts substantially based on the axial force of the output shaft, by releasing the locked state according to the actual steering angle index value (which naturally means "according to the actual steering angle").

The axial force of the output shaft is an element or parameter that can determine a load condition of the driving force providing means, and the magnitude of the axial force corresponds to the magnitude of the load applied to the driving force providing means. According to the present invention, even when the input and output shafts are in a locked state, a load condition of the driving force providing means after release of the lock can be estimated with high accuracy, no matter whether it is directly or indirectly estimated. Thus, a period of time for which the input and output shafts are locked can be reduced to be as short as possible, and an undesirable situation that the input and output shafts frequently switch between the locked state and the unlocked state can be prevented. Namely, it becomes possible to release the locked state at appropriate times.

The acquiring means may acquire the actual steering angle of the vehicle as the actual steering angle index value.

The acquiring means may acquire a lateral acceleration of the vehicle as the actual steering angle index value.

The acquiring means may acquire the actual steering angle of the vehicle and the lateral acceleration of the vehicle as the actual steering angle index value.

The vehicular steering control system according to the first aspect of the invention may further include setting means for setting a threshold value of the actual steering angle index value, based on which it is determined whether the actual steering angle is within a given lock release region, and determining means for determining whether the actual steering angle is within the lock release region, based on the acquired actual steering angle index value and the set threshold value. The above-indicated second control means may release the locked state when the determining means determines that the actual steering angle is within the lock release region.

According to the steering control system as described above, the threshold value of the actual steering angle index value, as a fixed value or a variable value, is set by the setting means that may take the form of, for example, any of various processing units, such as ECU, various controllers, and various computer systems, such as a microcomputer. The threshold value is a criterion value base on which it is determined whether the actual steering angle is in the lock release region in which the locked state of the input and output shafts may be released without causing no practical problem (for example, without giving rise to a situation where the input and output shafts are locked again immediately after the release). When it is determined, depending on the order of the actual steering index value, that the actual steering index value is equal to or larger than the threshold value (for example, when the actual steering index value takes the order of the inverse of the actual steering angle), or is equal to or smaller than the threshold value, the determination indicates that the actual steering angle is within the lock release region. The "equal to or larger than" and "equal to or smaller than" as mentioned above may be easily replaced by "larger than" and "smaller than", respectively, depending upon the manner of setting the criterion value. Which region to which the criterion value belongs is merely a matter of design, and does not constitute the essential of the invention.

In the meantime, the determining means that may take the form of, for example, any of various processing units, such as ECU, various controllers, and various computer systems, such as a microcomputer, compares the threshold value set in the above manner with the acquired actual steering angle index value, and makes a determination as to whether the actual steering angle is within the lock release region. If it is determined that the actual steering angle is within the lock release region, the locked state is released by the second control means. Where the actual steering angle index value is the actual steering angle itself, the above-indicated threshold value is the threshold value of the actual steering angle. In this case, when the actual steering angle index value is equal to or smaller than (or smaller than) the threshold value, it is determined that the actual steering angle is within the lock release region, and the release of the locked state may be permitted, in view of a general tendency that the magnitude of the actual steering angle corresponds to the magnitude of the axial force.

According to the steering control system as described above, it can be relatively easily determined whether the locked state of the input and output shafts should be released, based on a result of comparison between the threshold value and the actual steering angle index value.

The setting means may set the threshold value in accordance with the vehicle speed.

According to the steering control system as described above, the threshold value of the actual steering angle index value is set according to the vehicle speed. The axial force applied to the output shaft varies with the vehicle speed even where the actual steering angle is constant. Accordingly, with the above steering control system, the locked state of the input and output shafts can be appropriately released. In view of the fact that the axial force varies with the vehicle speed when the actual steering angle is constant, the locked state may be released according to the vehicle speed, in at least a practical mode of operation limited to the case where the actual steering angle is constant or substantially constant.

The setting means may set the threshold value so that the lock release region becomes smaller as the vehicle speed decreases, when the vehicle speed is in a given low-speed range.

In a low-speed range in which the vehicle speed is equal to zero (i.e., the steering wheel is manipulated while the vehicle is at a standstill) or close to zero, for example, the axial force applied to the output shaft increases as the vehicle speed decreases where the amount of turning of the steered wheels (or the actual steering angle) is constant. Accordingly, assuming that the axial force (that is a value that can specify a load condition of the driving force providing means) that can permit the release of the locked state of the input and output shafts is constant (needless to say, the axial force need not be constant according to the invention), the load release region that defines the range of the actual steering angle that can permit the release of the locked state of the input and output shafts is narrowed as the vehicle speed decreases.

According to the steering control system as described above, in a low-speed range set in advance empirically, theoretically or based on a simulation, or the like, as a region in which the axial force apparently increases with decrease of the vehicle speed, the threshold value of the actual steering angle index value is set so that the lock release region becomes smaller as the vehicle speed decreases, so that the locked state of the input and output shafts can be more appropriately released.

The setting means may set the threshold value so that the lock release region becomes larger as the vehicle speed decreases, when the vehicle speed is in a given high-speed range.

Unlike the low-speed range as described above, in a high-speed range (corresponding to a high-speed turning condition as a vehicle behavior pattern) in which the lateral acceleration or the lateral force applied to the tires is likely to apparently increase with increase of the actual steering angle, the lateral acceleration or lateral force applied to the tires is reduced as the vehicle speed decreases, and therefore, the axial force of the output shaft is reduced as the vehicle speed decreases. Accordingly, the lock release region can be expanded or made larger as the vehicle speed decreases.

According to the steering control system as described above, in a high-speed range set in advance empirically, theoretically or based on a simulation, or the like, as a region in which the axial force apparently decreases with decrease of the vehicle speed, the threshold value of the actual steering angle index value is set so that the lock release region becomes larger as the vehicle speed decreases, so that the locked state of the input and output shafts can be more appropriately released. Also, if the control for the high-speed range is combined with the control for the low-speed range as described above, the locked state of the input and output shafts can be released in a sophisticated manner according to the vehicle speed, resulting in a great practical advantage.

The setting means may set the threshold value so that the lock release region is constant when the vehicle speed is equal to or higher than an upper limit of a given low-speed range and is lower than a lower limit of a given high-speed range.

In the steering control system as described above, the vehicle may be further provided with assist steering force providing means capable of providing assist steering force to the output shaft.

According to the steering control system as described above, the vehicle is equipped with a steering force assist device, such as EPS (Electronically-controlled Power Steering), and is provided, as at least a part of the device, with the assist steering force providing means that takes the form of, for example, any type of various actuators including a motor or a similar electric motor. In this case, the steering force is generated from the output shaft with an aid of the assist steering force so as to turn the steered wheels; therefore, the axial force of the output shaft that has an influence on a load condition of the driving force providing means is reduced. Accordingly, the physical, mechanical or electric specifications or sizes of the driving force providing means can be reduced accordingly.

In the event that the operation of the assist steering force providing means of the above type is restricted or inhibited for some reason, the driving force providing means, whose specifications have been originally reduced in view of the provision of the assist steering force, is likely to be brought into an overloaded condition, and the input and output shafts are naturally more likely to be locked. Accordingly, in this case, a great practical advantage or benefit is provided by the effect of the above-described steering control system that the locked state is released at appropriate times.

The assist steering force providing means may include a motor capable of providing the assist steering force in accordance with driving current that is set within a range whose upper limit is set according to a thermal load, and the setting means may set the threshold value so that the lock release region becomes smaller as the upper limit of the range of the driving current decreases.

In this case, the driving current of the motor is restricted by the upper limit set for the purpose of protecting the motor against excessive heat, and the assist steering force is restricted accordingly. On the other hand, the axial force applied to the output shaft so as to turn the steered wheels increases as the actual steering angle increases, as already stated above, and the range of the steering angle in which the assist force can be added to the steering force is naturally narrowed as the upper limit of the driving current decreases, if running conditions other than the actual steering angle remain constant. In other words, a range of the actual steering angle in which the driving force providing means is apt to be brought into a highly loaded condition is expanded (i.e., the lock release region is narrowed). Thus, the protection of the driving force providing means is favorably achieved by setting the threshold value so that the lock release region is made smaller (i.e., the locked state is less likely to be released) as the upper limit of the driving current decreases.

A second aspect of the invention is concerned with a steering control method of a vehicle. The steering control method is applied to the vehicle including a driving force providing mechanism capable of providing at least one of an input shaft and an output shaft that are involved in transmission of a steering input, with driving force for rotating the input shaft and the output shaft relative to each other, and a lock mechanism capable of placing the input shaft and the output shaft in a locked state in which the input shaft and the output shaft are unable to rotate relative to each other. The steering control method includes the steps of: controlling the lock mechanism so that the input shaft and the output shaft are placed in the locked state when a given lock condition based on a load condition of the driving force providing mechanism is satisfied, acquiring an actual steering angle index value corresponding to an actual steering angle of the vehicle, and controlling the lock mechanism so as to release the locked state according to the acquired actual steering angle index value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
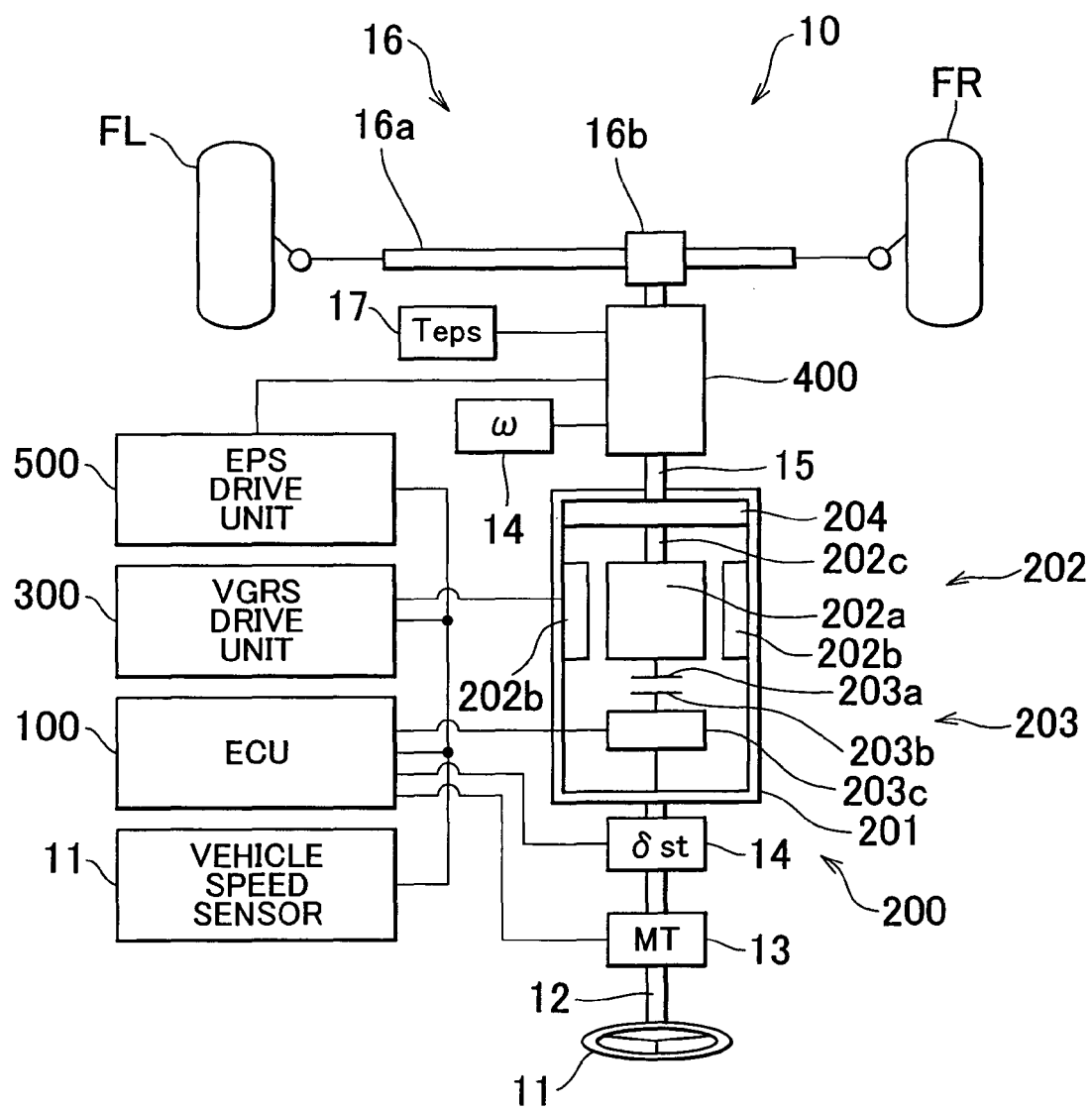
FIG. 1 is a view schematically illustrating the basic construction of a vehicle according to a first embodiment of the invention.

Referring to FIG. 1, the construction of a vehicle 10 according to a first embodiment of the invention will be described. FIG. 1 schematically illustrates the basic construction of the vehicle 10.

In FIG. 1, the vehicle 10 includes a pair of left and right front wheels FL and FR as steered wheels, and is able to run in a desired direction by turning the front wheels. The vehicle 10 includes an ECU 100, VGRS actuator 200, VGRS drive unit 300, EPS motor 400 and an EPS drive unit 500.

The ECU 100 is an electronic control unit including CPU (Central Processing Unit), ROM (Read Only Memory) and RAM (Random Access Memory), which are not illustrated in the drawings, and is arranged to control the overall operation of the vehicle 10. The ECU 100 is one example of the "vehicular steering control system" according to the invention. The ECU 100 is arranged to perform EPS control and VGRS control as will be described later, according to control programs stored in the ROM.

The ECU 100 is an integral electronic control unit arranged to function as one example of each of the "first control means", "acquiring means", "second control means", "setting means" and "determining means" according to the invention, and the operations of all of these means are performed by the ECU 100. It is, however, to be noted that physical, mechanical and electrical arrangements of each of these means according to the invention are not limited to those of this embodiment, but each of these means may consist of, for example, a plurality of ECUs, or any one or combination of various processing units, various controllers, and various computer systems, such as a microcomputer.

In the vehicle 10, steering input applied from the driver via a steering wheel 11 is transmitted to an upper steering shaft 12 that is coaxially rotatably coupled to the steering wheel 11 and serves as a shaft body capable of rotating with the steering wheel 11 in the same direction. The upper steering shaft 12 is one example of the "input shaft" according to the invention. The upper steering shaft 12 is coupled at a downstream end portion to the VGRS actuator 200 which will be described later.

The VGRS actuator 200 includes a housing 201, VGRS motor 202, lock mechanism 203 and a speed reducing mechanism 204.

The housing 201 is a case of the VGRS actuator 200 in which the VGRS motor 202, lock mechanism 203 and the speed reducing mechanism 204 are housed. The downstream end portion of the above-mentioned upper steering shaft 12 is fixed to the housing 201, and the housing 201 is able to rotate as a unit with the upper steering shaft 12.

The VGRS motor 202 is a DC brushless motor as one example of the "driving force providing means" according to the invention, which has a rotor 202a, a stator 202b and a rotary shaft 202c as an output shaft of the driving force. The stator 202b is fixed to the inner wall of the housing 201, and the rotor 202a is rotatably held in place within the housing 201. The rotary shaft 202c is fixed to the rotor 202a such that the rotary shaft 202c is coaxially rotatable as a unit with the rotor 202a, and has a downstream end portion coupled to the speed reducing mechanism 204.

The speed reducing mechanism 204 is a planetary gear set having a plurality of rotary elements (i.e., a sun gear, a carrier and a ring gear) capable of rotating in a differential fashion. Of these rotary elements, the sun gear as a first rotary element is coupled to the rotary shaft 202c of the VGRS motor 202, and the carrier as a second rotary element is coupled to the housing 201. The ring gear as a third rotary element is coupled to a lower steering shaft as one example of the "output shaft" according to the invention.

In the speed reducing mechanism 204 constructed as described above, the rotational speed of the lower steering shaft 15 coupled to the ring gear as the third rotary element is uniquely determined, based on the rotational speed of the upper steering shaft (i.e., the rotational speed of the housing 201 coupled to the carrier) that varies with an amount by which the steering wheel 11 is operated or manipulated, and the rotational speed of the VGRS motor 202 (i.e., the rotational speed of the rotary shaft 202c coupled to the sun gear). The rotational speed of the lower steering shaft 15 can be controlled, i.e., increased or reduced, by controlling (increasing or reducing) the rotational speed of the VGRS motor 202 through differential operations among the rotary, elements. Namely, the VGRS motor 202 and the speed reducing mechanism 204 cooperate with each other to allow the upper steering shaft 12 and the lower steering shaft 15 to rotate relative to each other. With the respective rotary elements of the speed reducing mechanism 20 constructed as described above, the rotation of the VGRS motor 202 is transmitted to the lower steering shaft 15 while the rotational speed of the VGRS motor 20 is reduced according to a given reduction ratio that is determined depending on the gear ratios among the rotary elements.

Thus, in the vehicle 10 in which the upper steering shaft 12 and the lower steering shaft 15 are rotatable relative to each other, a steering transmission ratio Rvgrs, which is a ratio between a steering angle δst as the amount of rotation of the upper steering shaft 12 and an actual steering angle δr that is uniquely determined according to the amount of rotation of the lower steering shaft 15 (and is also related with the gear ratio of a rack-and-pinion mechanism as described later), is controlled to be continuously variable within a predetermined range.

The speed reducing mechanism 204 is not limited to the planetary gear set as illustrated above, but may be constructed in other forms. In one exemplary form of the speed reducing mechanism 204, gears having different numbers of teeth are respectively coupled to the upper steering shaft 12 and the lower steering shaft 15, and a flexible gear that is partially in contact with each of the gears is mounted. In operation, the flexible gear is rotated with motor torque transmitted via a wave generator, so that the upper steering shaft 12 and the lower steering shaft 15 rotate relative to each other. The speed reducing mechanism 204 may also be a planetary gear set having a physical, mechanical, or structural arrangement different from that of the planetary gear set as described above.

Although not illustrated in the drawings, the VGRS motor 202 is equipped with a rotation sensor, such as a rotary encoder, which is arranged to detect a rotational phase difference $\Delta\delta$ between the rotary shaft 202c and the housing 201. The rotation sensor is electrically connected to the ECU 100, and the ECU 100 receives the detected rotational phase difference $\Delta\delta$ at regular or irregular time intervals.

The lock mechanism 203, which is one example of the "lock means" according to the invention, includes a lock holder 203a, lock bar 203b and a solenoid 203c.

The lock holder 203a is a disc-like member that is fixed to the rotor 202a of the VGRS motor 202 and is rotatable as a unit with the rotor 202a. A plurality of recesses are formed in an outer peripheral portion of the lock holder 203a to be arranged in the circumferential direction thereof.

The lock bar 203b is a lever-like engaging member which is fixed at one end portion to a fixed portion provided on the housing 201 of the VGRS actuator 200, and which is arranged to be rotatable about the fixed portion as a pivot. A protrusion that can engage with one of the recesses formed in the outer peripheral portion of the lock holder 203a is formed on the other end portion of the lock bar 203b, and the lock bar 203b is arranged to be rotatable or pivotable over a range from a lock position at which the protrusion engages with one of the recesses formed in the outer peripheral portion of the lock holder 203a, and a lock release position at which the lock bar 203b and the lock holder 203a are spaced apart from each other.

The solenoid 203c is an electromagnetic actuator capable of providing driving force for rotating the lock bar 203b. By applying the driving force to the lock bar 203b, the solenoid 203 is able to rotate the lock bar 203b between the above-mentioned lock position and the lock release position. Thus, the lock mechanism 203 is arranged to be placed in a selected one of two operating states, namely, a locked state in which the protrusion of the lock bar 203b engages with one of the recesses of the lock holder 203a, and an unlocked state in which the corresponding protrusion and recess are spaced apart from each other. The solenoid 203c is electrically connected to the ECU 100, and the driving or operating state of the solenoid 203c is controlled by the ECU 100.

When the lock mechanism 203 is in the locked state, the housing 201 and the rotor 202a are physically fixed to each other, so that the rotational speeds of two rotary elements of the speed reducing mechanism 204 to which the housing 201 and the rotor 202a are coupled become equal to each other. Therefore, the rotational speed of the remaining rotary element coupled to the lower steering shaft 15 is uniquely determined. As a result, when the lock mechanism 203 is in the locked state, the upper steering shaft 12 and the lower steering shaft 15 become unable to rotate relative to each other, and the above-mentioned steering transmission ratio Rvgrs is fixed to one value. To the contrary, when the lock mechanism 203 is in the unlocked state, the rotation of the rotor 202a is not restricted by the housing 201; therefore, the upper steering shaft 12 and the lower steering shaft 15 are rotatable relative to each other, and the steering transmission ratio Rvgrs can be varied. Namely, the statement that the lock mechanism 203 is in a locked state is equivalent to the statement that "the input shaft and the output shaft are in a locked state" according to the invention, and the statement that the lock mechanism 203 is in an unlocked state is equivalent to the statement that "the locked state is released" according to the invention.

In the following description, an expression, such as "the VGR motor 202 is in a locked state and an unlocked state", may be used when appropriate to indicate that the lock mechanism 203 is in a locked state and an unlocked state, respectively.

The VGRS drive unit 300 is an electric drive circuit including a PWM circuit, a transistor circuit, an inverter, or the like, which is arranged to allow electric current to be applied to the stator 202b of the VGRS motor 202. The VGRS drive unit 300 is electrically connected to a battery (not shown), and is arranged to supply a driving voltage to the VGRS motor 202, using electric power supplied from the battery. The VGRS drive unit 300 is also electrically connected to the ECU 100, and its operation is controlled by the ECU 100.

The EPS motor 400, which is a DC brushless motor as one example of the "steering assisting means" according to the invention, includes a rotor (not shown) that has permanent magnets attached thereto and is fixed to the lower steering shaft 15 at the downstream side of the VGRS motor 202, and a stator that surrounds the rotor. In operation, the rotor rotates under the influence of a rotating magnetic field formed in the EPS motor 400 when electric current is applied to the stator via the EPS drive unit 500, so that the EPS motor 400 generates assist torque Tm (one example of the "assist steering force" according to the invention) in the direction of rotation of the rotor.

The EPS drive unit 500 is an electric drive circuit that is arranged to control a condition of the rotating magnetic field formed within the EPS motor 400 upon application of electric current to the stator of the EPS motor 400. The EPS drive unit 500 is electrically connected to the ECU 100, and its operation is controlled by the ECU 100. In the following description, the term "EPS" will be used when appropriate to represent a concept including the EPS motor 400 and the EPS drive unit 500.

The rotation of the lower steering shaft 15 to which the assist torque Tm is provided as needed from the EPS motor 400 is transmitted to a rack-and-pinion mechanism 16. The rack-and-pinion mechanism 16 is a steering mechanism including a pinion gear 16b connected to a downstream end portion of the lower steering shaft 15, and a rack bar 16a formed with gear teeth that mesh with gear teeth of the pinion gear 16b. In operation, the rotation of the pinion gear 16b is converted to a rectilinear motion of the rack bar 16a in the lateral direction in FIG. 1 so that steering force is transmitted to each steered wheel via a tie rod and a knuckle which are coupled to each downstream end portion of the rack bar 16a. Namely, the rack-and-pinion mechanism 16 enables the vehicle 10 to operate in a so-called rack-and-pinion type steering mode.

The vehicle 10 may operate in other steering modes, using a ball nut type steering mechanism or other steering mechanisms. Where the rack-and-pinion type steering mechanism is employed, the types and shapes of its constituent elements, spatial arrangements or positional relationships among the constituent elements, and so forth, are not limited by any means, provided they are within the range of substantial restrictions (if any) in terms of at least the installation space, cost, durability or reliability, for example.

The manner of providing the "assist steering force" according to the invention is not limited to the one as illustrated above. For example, the assist torque Tm generated from the EPS motor 400 may be transmitted to the lower steering shaft 15 after reduction of the rotational speed by reduction gears (not shown), or the assist torque Tm may be provided as a force that assists in the reciprocating motion of the rack bar 16a rather than the rotary motion of the lower steering shaft 15, or as a force that assists in the rotation of the pinion gear 16b. Namely, the manner of providing the assist steering force according to the invention is not limited by any means, as long as the assist torque Tm generated from the EPS motor 400 is eventually provided as at least a part of the steering force for steering or turning each steered wheel.

In the meantime, the vehicle 10 is provided with various sensors, including a torque sensor 13, steering angle sensor 14, temperature sensor 17 and a rotation sensor 18.

The torque sensor 13 is arranged to detect the steering torque MT applied by the driver. More specifically, the upper steering shaft 12 is divided into an upstream portion and a downstream portion, which are coupled to each other with a torsion bar (not shown). Rings for detecting a rotational phase difference are fixed to the opposite (i.e., upstream and downstream) end portions of the torsion bar. The torsion bar is arranged to twist in the direction of rotation of the upper steering shaft 12, according to the steering torque transmitted via the upstream portion of the upper steering shaft 12 when the driver of the vehicle 10 manipulates the steering wheel 11, and is also arranged to transmit the steering torque to the downstream portion while forming torsion. Accordingly, a rotational phase difference arises between the above-mentioned phase-difference detection rings. The torque sensor 13, which detects the rotational phase difference, is operable to convert the rotational phase difference into steering torque, and produce an output in the form of an electric signal corresponding to the steering torque MT. Also, the torque sensor 13 is electrically connected to the ECU 100, and the ECU 100 receives the detected steering torque MT at regular or irregular time intervals.

The steering angle sensor 14 is arranged to detect a steering angle δst representing the amount of rotation of the upper steering shaft 12. The steering angle sensor 14 is electrically connected to the ECU 100, and the ECU 100 receives the detected steering angle δst at regular or irregular time intervals.

The temperature sensor 17 is arranged to detect a motor temperature Teps as the temperature of the EPS motor 400. The temperature sensor 17 is electrically connected to the ECU 100, and the ECU 100 receives the detected motor temperature Teps at regular or irregular time intervals. The motor temperature Teps is one example of the "thermal load" according to the invention.

The rotation sensor is one type of rotary encoder capable of detecting a motor speed ωeps as the rotational speed of the EPS motor 400. The rotation sensor 18 is electrically connected to the ECU 100, and the ECU 100 receives the detected motor speed ωeps at regular or irregular time intervals. It is, however, to be understood that the means for detecting the rotational speed of the EPS motor 400 is not limited to the rotary encoder, but may be, for example, a resolver.

In the following, the operation of this embodiment will be described with reference to the drawings as needed.

Figure 2:
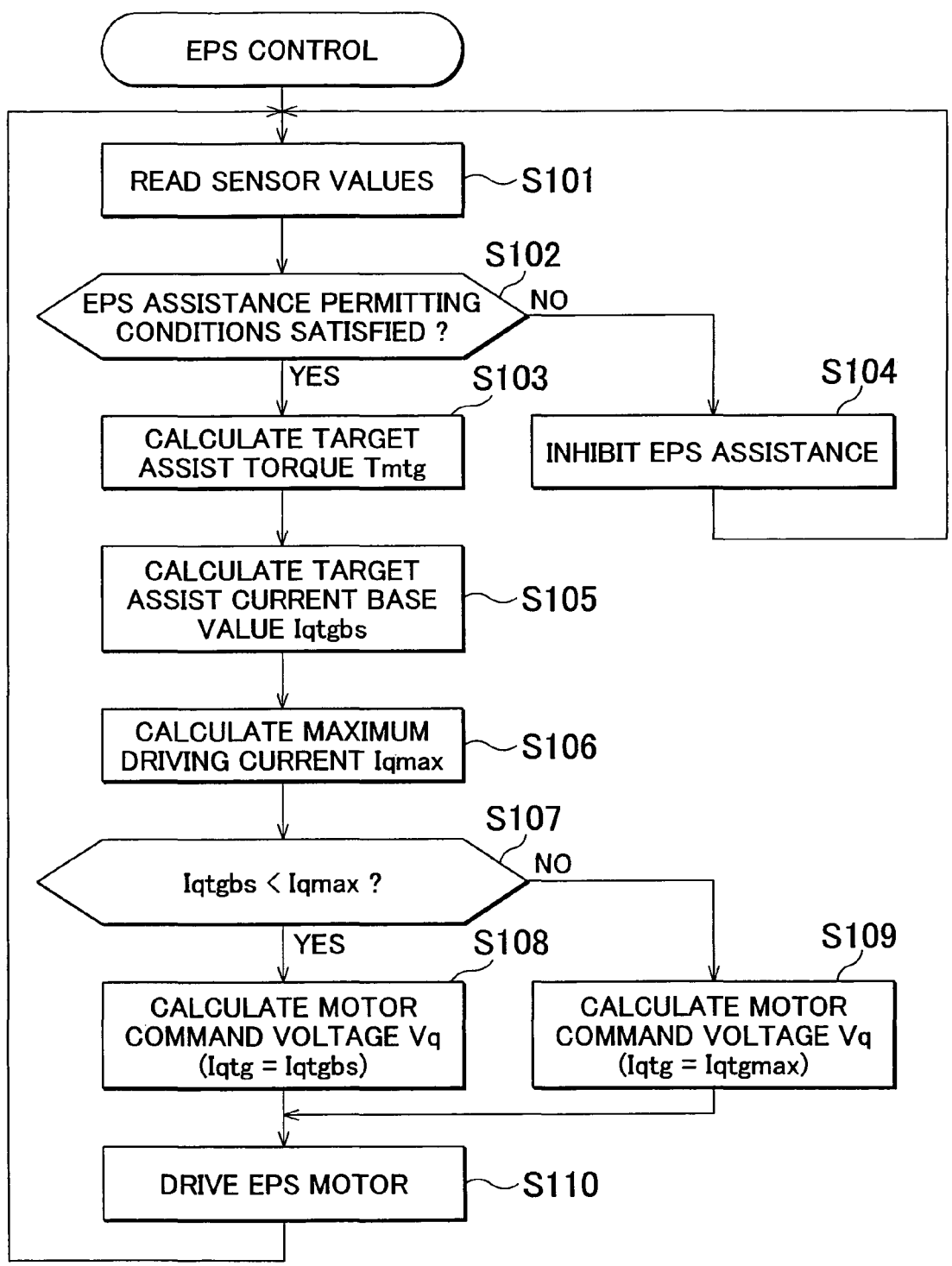
FIG. 2 is a flowchart of EPS control performed by ECU in the vehicle of FIG. 1.

Initially, details of the EPS control performed by the ECU 100 will be described, with reference to FIG. 2. FIG. 2 is a flowchart of the EPS control.

In FIG. 2, the ECU 100 acquires a detection value of each sensor (step S101). In this step, the ECU 100 acquires the steering torque MT, steering angle δst, motor temperature Teps, and the motor speed ωeps.

Then, the ECU 100 determines whether certain conditions for permitting EPS assistance are satisfied (step S102). Here, the "EPS assistance permitting conditions" refer to conditions under which the assist torque Tm is permitted to be provided via the EPS motor 400.

For example, driving of the EPS motor 400 is inhibited in the cases where a sufficient driving voltage cannot be supplied to the EPS motor 400 for a reason such as that the SOC (State Of Charge) of the battery as a power supply of the EPS drive unit 500 is significantly reduced, where the EPS motor 400 is in an overheated condition, and driving of the EPS motor 400 should be inhibited for the sake of protection from the thermal load, and where the steered wheel is subjected to a resistance from a curb or an obstacle, whereby the axial force applied to the lower steering shaft 15 upon steering exceeds or may possibly exceed the maximum torque of the EPS motor 400. In these cases, the EPS assistance permitting conditions are not satisfied.

In step S102, it is determined whether the EPS motor 400 is in any of the above-indicated special conditions, based on, for example, the battery voltage, motor temperature Teps, or the steering torque MT. If the EPS assistance permitting conditions are not satisfied (step S102: NO), the ECU 100 inhibits the application of the assist torque Tm from the EPS motor 400 (step S104). After the assistance of the EPS for increasing the steering force is inhibited, the control returns to step S101.

If, on the other hand, the EPS assistance permitting conditions are satisfied (step S102: YES), the ECU 100 calculates a target assist torque Tmtg as a target value of the assist torque Tm to be generated from the EPS motor 400 (step S103). In this step, the target assist torque Tmtg is set as a value that increases nonlinearly as the steering torque MT increases, according to the steering torque MT acquired in step S101. Also, the target assist torque Tmtg is set to zero in a region (which may be called "dead zone") in which the steering torque MT is equal to or less than a reference value. The ECU 100 stores a target assist torque map in the ROM in advance, which map defines the relationship between the steering torque MT and the target assist torque Tmtg, and selectively acquires one value corresponding to the current steering torque MT, from the target assist torque map, to thus calculate the target assist torque Tmtg. Thus, the "calculation" mentioned in this embodiment refers to a concept including selective acquisition of one value based on the pre-set relationship.

After calculating the target assist torque Tmtg, the ECU 100 calculates a base value Iqtgbs of target assist current Iqtg as a target value of assist current Iq (step S105). The target assist current base value Iqtgbs is calculated as a result of a numerical or arithmetic operation performed by dividing the target assist torque Tm by the motor torque constant of the EPS motor 400.

After calculating the target assist current base value Iqtgbs, the ECU 100 calculates the maximum driving current Iqmax (step S106). The maximum driving current Iqmax is the maximum value of the driving current Iq set for protecting the EPS motor 400 from a thermal load. The maximum driving current Iqmax is set according to the motor temperature Teps, such that the maximum driving current Iqmax increases as the motor temperature Teps decreases.

After calculating the maximum driving current Iqmax, the ECU 100 determines whether the target assist current base value Iqtgbs calculated in step S105 is smaller than the above-mentioned maximum driving current Iqmax (step S107). If the target assist current base value Iqtgbs is smaller than the maximum driving current Iqmax (step S107: YES), the ECU 100 sets the target assist current base value Iqtgbs as a target assist current Iqtg, and calculates a motor command voltage Vq based on the target assist current Iqtg (step S108). If, on the other hand, the target assist current base value Iqtgbs is equal to or larger than the maximum driving current Iqmax (step S107: NO), the ECU 100 sets the maximum driving current Iqmax as a target assist current Iqtg, and calculates a motor command voltage Vq based on the target assist current Iqtg (step S109). In either case, the motor command voltage Vq is determined so as to cancel or eliminate an influence of counter electromotive force produced in accordance with the motor speed ωeps.

After calculating the motor command voltage Vq, the ECU 100 drives the EPS motor 400 based on the motor command voltage Vq (step S110).

As additional information, the ECU 100 controls the EPS drive unit 500 to produce a PWM control voltage signal corresponding to the calculated motor command voltage Vq (q-axis voltage of the EPS motor 400), and supply the PWM control voltage signal to a FET drive circuit having FETs corresponding to three phases. The motor command voltage Vq is provided for production of the PWM control voltage signal after being converted into three-phase command voltages Vu, Vv and Vw corresponding to u phase, v phase and w phase, respectively, through three-phase conversion. In the FET drive circuit, a gate terminal of each FET receives the PWM control voltage signal, and assist current Iq as driving current is supplied to the stator according to the PWM control voltage signal supplied to the gate terminal. In the EPS motor 400, a rotating magnetic field is formed by the driving current Iq, and the rotor is rotated under the magnetic field so as to generate the assist torque Tm. After the EPS motor 400 is driven in step S110, the control returns to step S101, and the above-indicated series of steps is repeated. The provision of the assist force to the steering force in the vehicle 10 is accomplished in the manner as described above.

Figure 3:
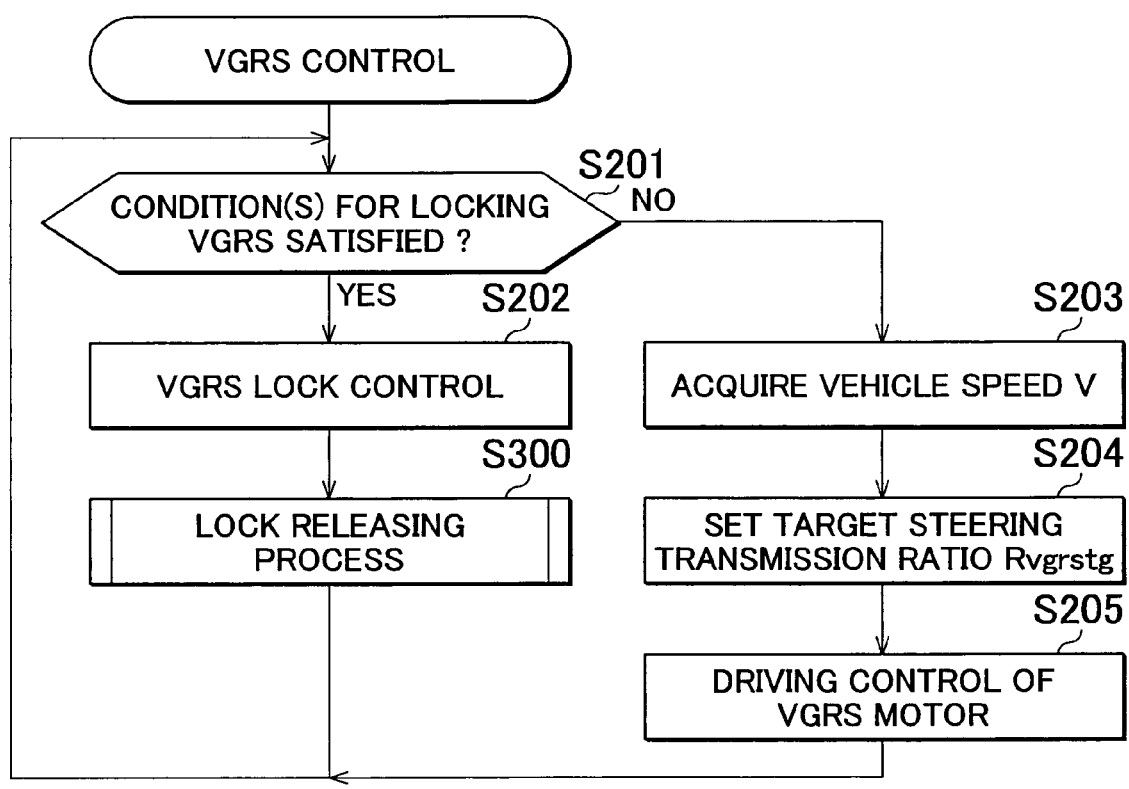
FIG. 3 is a flowchart of VGRS control performed by ECU in the vehicle of FIG. 1.

Referring next to FIG. 3, driving control of the VGRS actuator 200 will be described. FIG. 3 is a flowchart of the VGRS control performed by the ECU 100.

In FIG. 3, the ECU 100 determines whether the VGRS motor 202 should be locked (step S201). The statement that the VGRS motor 202 is locked means that the lock mechanism 203 is brought into a locked state, or that the solenoid 203c is driven under control so as to move the lock bar 203b to the above-indicated lock position. When the VGRS motor 202 is locked, the upper steering shaft 12 and the lower steering shaft 15 are connected directly with each other, and become unable to rotate relative to each other, so that an excessive load is prevented from being applied to the VGRS motor 202.

Whether the VGR motor 202 should be locked or not is individually and specifically determined for each cycle of the routine, according to the current or predictive load condition of the VGRS motor 202. For example, when the assistance of the EPS for increasing the steering force is inhibited in step S104 of FIG. 2, the axial force applied to the lower steering shaft 15 during steering is highly likely to exceed the maximum torque of the VGRS motor 202 (the specifications of the VGRS motor 202 are originally determined on the assumption that the load applied to the VGRS motor 202 is reduced due to the provision of the assist torque Tm by the EPS motor 400); therefore, the VGRS motor 202 may be locked. Also, it may be determined whether the VGRS motor 202 should be locked, based on the steering torque MT detected by the torque sensor 13 or a driving condition of the VGRS drive unit 300 (e.g., the driving voltage or driving current of the VGRS motor 202). For example, it is determined that the VGRS motor 202 should be locked when absolute values of the driving voltage and driving current are large, for example.

If it is determined that the VGRS motor 202 should be locked (step S201: YES), the ECU 100 performs driving control of the solenoid 203c of the lock mechanism 203 so as to rotate the lock bar 203b to the above-indicated lock position and bring the lock mechanism 203 into a locked state, thereby to place the VGRS motor 202 in a locked state (step S202). After the VGRS motor 202 is placed in the locked state under control of the ECU 100, a lock releasing process as will be described later is performed (step S300).

If, on the other hand, the VGR motor 202 need not be locked (step S201: NO), the ECU 100 acquires the vehicle speed V (step S203), and sets a target steering transmission ratio Rvgrstg as a target value of the steering transmission ratio Rvgrs, based on the acquired vehicle speed V (step S204). The target steering transmission ratio Rvgrstg may be set in any of various known manners. For example, the vehicle speed V may be divided into three ranges, i.e. a low-speed range, a middle-speed range and a high-speed range, and the steering transmission ratio Rvgrs may be set to a relatively small fixed value in the low-speed range so that a large actual steering angle can be achieved by a small steering angle (it is to be noted that the steering transmission ratio Rvgrs of this type is a matter of design, and is only qualitatively expressed herein). Also, the steering transmission range Rvgrs may be set to a variable value that increases as the vehicle speed increases in the middle-speed range, and may be set to a relatively large fixed value in the high-speed range so that the behaviors or movements of the steered wheels are stabilized (namely, the sensitivity of the actual steering angle to the steering angle is reduced). Needless to say, the manner of setting the target steering transmission ratio is not limited to the one as described above.

After setting the target steering transmission ratio Rvgrstg, the ECU 100 performs driving control of the VGRS motor 202 via the VGRS drive unit 300 so as to achieve the target steering transmission ratio Rvgrstg set in step S204 (step S205). As an example of the manner of driving the VGRS motor 202, PWM control corresponding to three phases is performed on the VGRS motor 202, similarly to the EPS motor 400.

After the lock releasing process is finished, or step S205 is executed, the control returns to step S201, and the above-indicated series of steps is repeated. In this embodiment, the VGRS control is performed in the manner as described above.

Once the VGRS motor 202 is switched to the locked state, it becomes difficult to highly accurately estimate a load condition of the VGRS motor 202 in the case where the locked state is released. If the locked state is released even though the VGRS motor 202 is held under a high-load condition, the VGR motor 202 repeatedly switches between the locked state and the unlocked state, resulting in occurrence of noise and vibrations in the vehicle 10 and reduction of the driveability, which may present practical problems. On the other hand, if the locked state is not released with safety in mind, the steering transmission ratio is kept fixed, and the steering performance may deteriorate. In this embodiment, therefore, the lock releasing process is performed so that the locked state of the VGRS motor 202 can be appropriately released.

Figure 4:
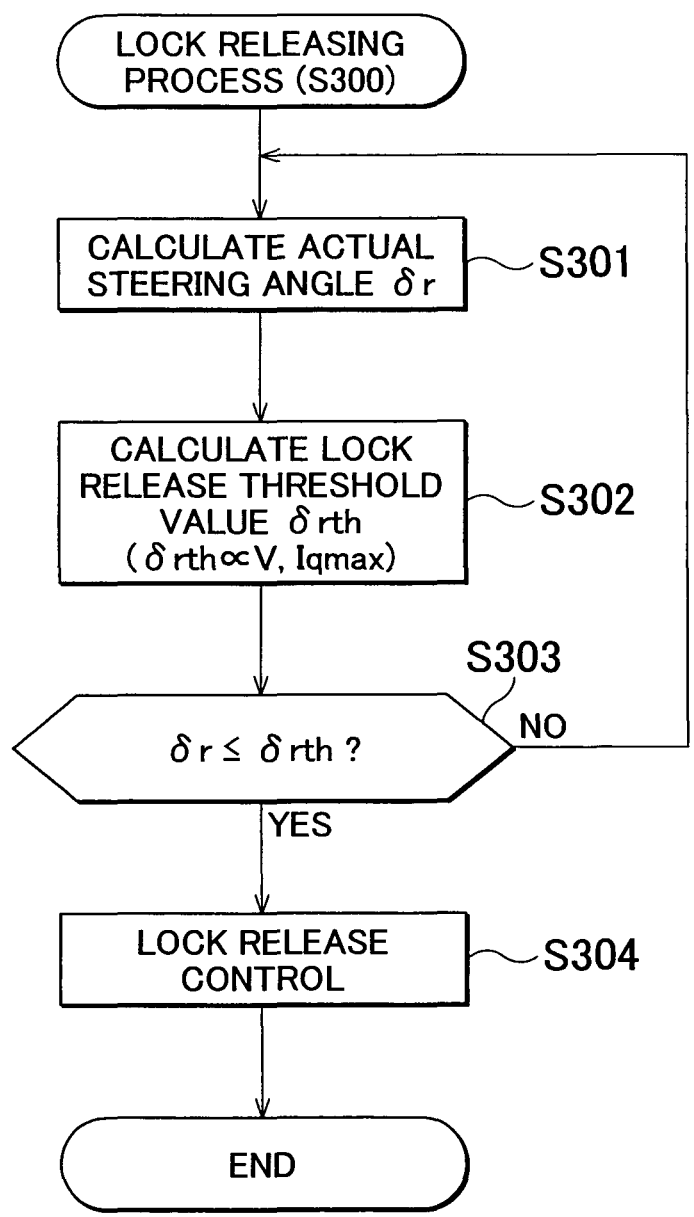
FIG. 4 is a flowchart of a lock releasing process performed as needed during the VGRS control of FIG. 3.

Referring to FIG. 4, the lock releasing process will be described in detail. FIG. 4 is a flowchart of the lock releasing process.

In FIG. 4, the ECU 100 calculates the actual steering angle $\delta r$ (step S301). Here, the actual steering angle $\delta r$, which is one example of the "actual steering angle index value" according to the invention, is calculated based on the steering angle $\delta st$ detected by the steering angle sensor 14, rotational phase difference $\Delta\delta$ detected by the rotation sensor mounted in the VGRS motor 202, reduction ratio of the speed reducing mechanism 204, gear ratio of the rack-and-pinion mechanism 16, and so forth. It is to be understood that the "actual steering index value" according to the invention is a value correlated with the actual steering angle, and is not necessarily limited to the actual steering angle $\delta r$. Also, if the vehicle 10 is equipped with an actual steering angle sensor capable of directly detecting the actual steering angle $\delta r$, the actual steering angle $\delta r$ may be directly acquired from the actual steering angle sensor.

After calculating the actual steering sensor $\delta r$, the ECU 100 calculates a lock release threshold value $\delta rth$ as one example of the "threshold value" according to the invention (step S302).

Here, the lock release threshold value $\delta rth$ is set in advance empirically or theoretically, or based on a simulation, or the like, so that the locked state of the VGRS motor 202 is released as immediately as possible, and the VGRS motor 202 will not be brought into the locked state again immediately after release of the locked state. More specifically, a threshold map that defines the relationship between the vehicle speed V and the maximum drive current Iqmax, and the lock release threshold value $\delta rth$ is stored in the ROM of the ECU 100, and the ECU 100 selectively acquires one value (threshold value) corresponding to the current vehicle speed V and the maximum drive current Iqmax, from the threshold map, to thus calculate the lock release threshold value $\delta rth$.

After calculating the lock release threshold value $\delta rth$, the ECU 100 determines whether the actual steering angle $\delta r$ calculated in step S301 is equal to or smaller than the lock release threshold value $\delta rth$ (step S303). If the actual steering angle $\delta r$ is equal to or smaller than the lock release threshold value $\delta rth$ (step S303: YES), the ECU 100 performs driving control of the solenoid 204c of the lock mechanism 204 so as to rotate the lock bar 204b to the lock release position, thereby to release the locked state of the VGRS motor 202 (step S304). After the lock state is released, the lock releasing process is finished. If, on the other hand, the actual steering angle $\delta r$ is larger than the lock release threshold value $\delta rth$ (step S303: NO), the control returns to step S301, and the above-indicated series of steps is repeated while the VGRS motor 202 is kept in the locked state.

Figure 5:
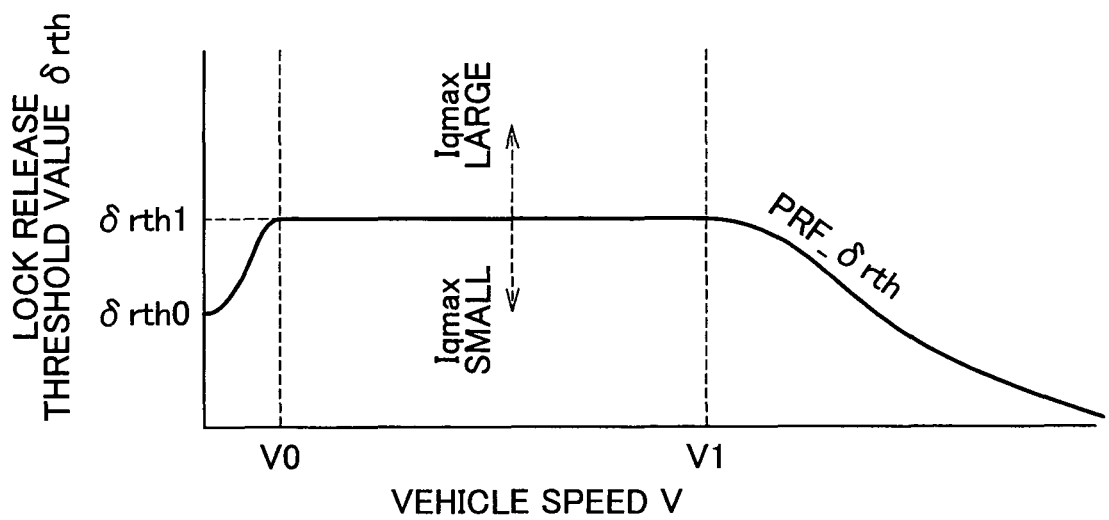
FIG. 5 is a schematic view illustrating one example of characteristics of a lock release threshold value δrth referred to in the lock releasing process of FIG. 4, with respect to the vehicle speed.

Referring to FIG. 5, characteristics of the lock release threshold value $\delta rth$ will be explained. FIG. 5 is a schematic view illustrating one example of the characteristics of the lock release threshold value $\delta rth$.

In FIG. 5, the lock release threshold value $\delta rth$ varies as represented by PRG_$\delta rth$ (shown in FIG. 5) with respect to the vehicle speed V. More specifically, in a low-speed range (i.e., one example of the "given low-speed range" according to the invention) in which the vehicle speed V is lower than V0, the lock release threshold value $\delta rth$ is set to a smaller value (i.e., the locked state is less likely to be released, or "the lock release region is reduced" according to the invention) as the vehicle speed V decreases. When the vehicle 10 is at rest or stopped, in particular, the lock release threshold value $\delta rth$ is set to $\delta rth0$. In a high-speed range (i.e., one example of the "given high-speed range" according to the invention) in which the vehicle speed V is equal to or higher than V1 (V1>V0), the lock release threshold value $\delta rth$ is set to a larger value (i.e., the locked state is more likely to be released, or "the lock release region is increased" according to the invention) as the vehicle speed V decreases. Also, in a middle-speed range in which the vehicle speed V is equal to or higher than V0 and lower than V1, the lock release threshold value δrth is set to a fixed value δrth1 (δrth1>δrth0). In this embodiment, the reference value V0 that defines the low-speed range takes a value around, for example, 15 km/h, and the reference value V1 that defines the high-speed range takes a value around, for example, 100 km/h.

Here, the characteristics of the lock release threshold value δrth will be further explained. In the low-speed range, the axial force applied to the lower steering shaft 14 at a certain actual steering angle δr increases as the vehicle speed decreases. Since the load that is allowed to be imposed on the VGRS motor 202 is almost irrelevant to the vehicle speed, it is desirable to make the lock release threshold value δrth relatively small in the low-speed range. Also, in the high-speed range, the axial force applied to the lower steering shaft 15 at a certain actual steering angle δr increases as the vehicle speed increases. This is because, when the steered wheels turn in the high-speed range, the vehicle 10 is subjected to a lateral acceleration proportional to the vehicle speed. Thus, it is desirable to set the lock release threshold value δrth to a smaller value as the vehicle speed increases in the high-speed range, for substantially the same reason as that in the case of the low-speed range.

In the meantime, the PRF_δth as shown in FIG. 5 represents characteristics of the lock release threshold value δrth for the case where the maximum driving current Iqmax of the EPS motor 400 as described above takes a given value. In this embodiment, the lock release threshold value δrth is set with respect to changes in the maximum driving current Iqmax, such that the threshold value δrth at a certain vehicle speed is set to a smaller value as Iqmax decreases, as indicated by arrows in FIG. 5. The maximum driving current Iqmax is equivalent in meaning to the maximum assist torque of the EPS motor 400, and increase and decrease of the actual steering angle δ basically correspond to increase and decrease of the axial force. Accordingly, as the maximum assist torque decreases, a limit of the actual steering angle δr at which assist torque that can resist the axial force can be generated is reduced, and a permissible assist range in which the EPS motor 400 can provide assistance (or produce assist torque) is narrowed. If the permissible assist range is narrowed, the range of the actual steering angle in which the VGRS motor 202 undergoes an excessive load expands. Therefore, it is desirable to increase and decrease the lock release threshold value δrth as the maximum drive current Iqmax increases and decreases, respectively.

Thus, in the lock releasing process of this embodiment, the actual steering angle δr is used as the "actual steering angle index value" according to the invention, and it is appropriately determined whether the locked state of the VGRS motor 202 should be released, based on a comparison between the actual steering angle δr, and the lock release threshold value δrth that is set so that the locked state of the VGRS motor 202 can be released in view of the axial force applied to the lower steering shaft 15 during steering. Accordingly, it is possible to release the locked state of the VGRS motor 202 as immediately as possible, while preventing the occurrence of noise and vibrations and reduction of the driveability, which would be otherwise caused by frequent switching of the VGRS motor 202 between the unlocked (released) state and the locked state.

In addition, the actual steering angle index value according to the invention is to be construed as alternatively representing the axial force applied to the output shaft (the lower steering shaft 15 in this embodiment) during steering. Thus, the above-described lock release control performed by comparing the actual steering angle index value with the lock release threshold value is essentially different from control under which it is determined whether the locked state should be released, depending on the magnitude of the actual steering angle or steering angle as viewed only in terms of angle, for example, depending upon whether the actual steering angle or steering angle is close to the steering end or limit.

Figure 6:
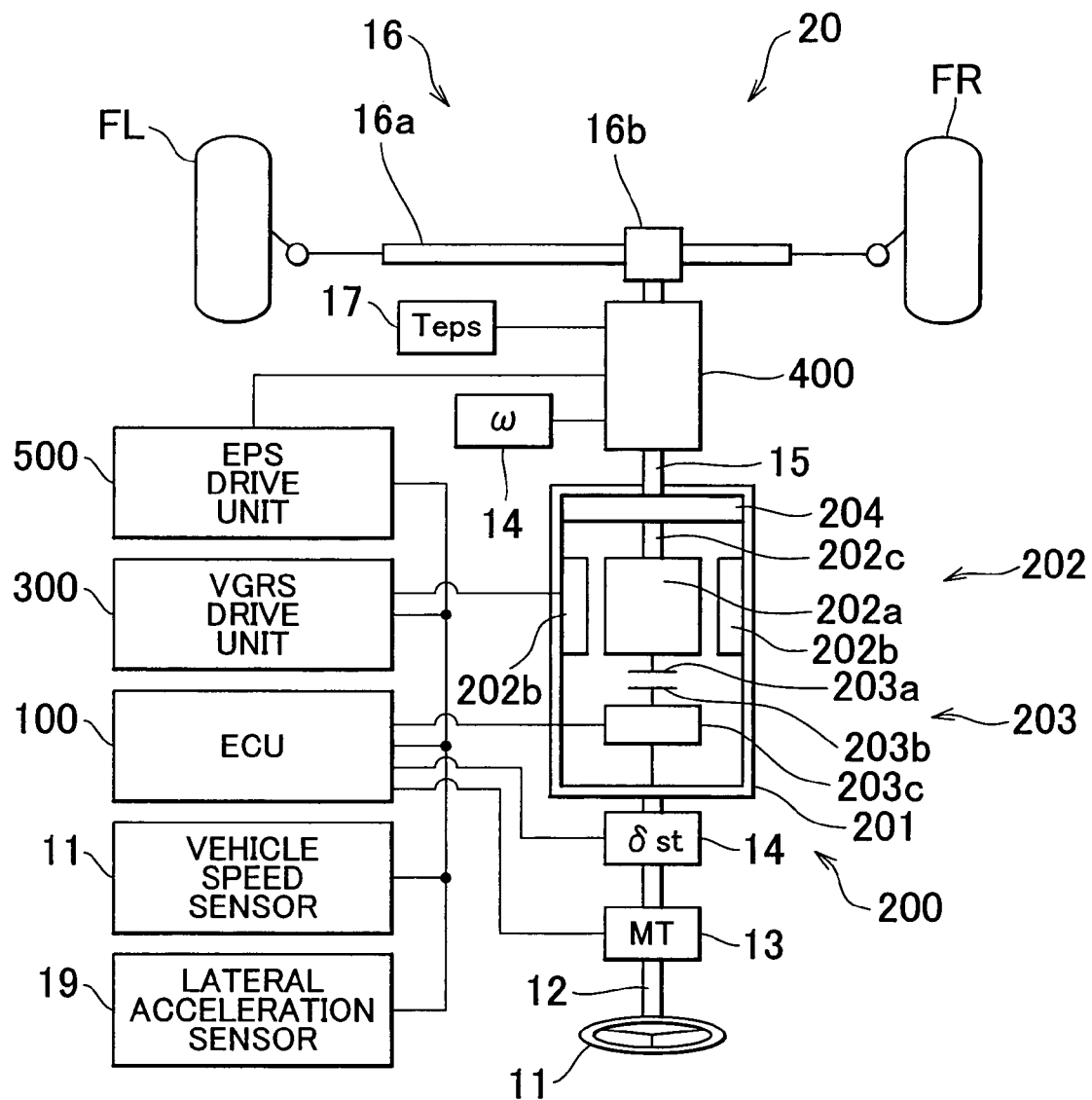
FIG. 6 is a view schematically illustrating the basic construction of a vehicle according to a second embodiment of the vehicle.

Referring next to FIG. 6, a second embodiment of the invention will be described. FIG. 6 schematically illustrates the basic construction of a vehicle 20 according to the second embodiment of the invention. In FIG. 6, the same reference numerals as used in FIG. 1 are used for identifying the same or corresponding elements or portions, of which explanation will be omitted as appropriate.

In FIG. 6, the vehicle 20 is different from the vehicle 10 in that the vehicle 20 is equipped with a lateral acceleration sensor 19. The lateral acceleration sensor 19 is arranged to detect a lateral acceleration Gs applied to the vehicle 20. The lateral acceleration sensor 19 is electrically connected to the ECU 100, and the ECU 100 receives the detected lateral acceleration Gs at regular or irregular intervals.

When a lock releasing process similar to that of the first embodiment as illustrated in FIG. 4 is performed, the lateral acceleration Gs may be used as one example of the "actual steering angle index value" according to the invention, in place of or in addition to the actual steering angle δr, in the above-described high-speed range, or in a part of the above high-speed range, or in an expanded vehicle speed range including the above high-speed range.

In general, the lateral acceleration Gs applied to the vehicle has a tendency of having a higher sensitivity to the actual steering angle δr (which may be the steering angle δst) (for example, the lateral acceleration per unit actual steering angle increases) as the vehicle speed increases in a high-speed range. Also, the lateral acceleration Gs is correlated with the axial force applied to the lower steering shaft 15 during steering, and the axial force increases (namely, it becomes more difficult to steer the vehicle) as the lateral acceleration Gs increases. Even in the case where the actual steering angle or becomes equal to or smaller than the lock release threshold value δrth, and it may be determined that the actual steering angle δr is within the lock release range, the lateral acceleration Gs may be large enough to create the axial force that may bring the VGRS motor 202 into an overloaded condition. In this case, if the locked state is released, the VGRS motor 202 is eventually controlled back to the locked state under the VGRS control as shown in FIG. 3, after the release of the locked state, and the VGRS motor 202 may switch frequently between the locked state and the unlocked or released state.

In view of the above situation, a threshold value for the lateral acceleration Gs is set in advance empirically or theoretically, or based on a simulation, or the like, (or may be derived on each occasion from a suitable algorithm or arithmetic expression), so that the axial force is held in a range in which the locked state of the VGRS motor 202 can be released. In this manner, a determination as to whether the locked state can be released is made with respect to the high-speed range, as appropriately as or more appropriately than in the first embodiment. The high-speed range as mentioned above may be a vehicle speed range in which the sensitivity of the lateral acceleration Gs to the actual steering angle δr is sufficiently high at least in practice.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A steering control system of a vehicle, which includes driving force providing means capable of providing at least one of an input shaft and an output shaft that are involved in transmission of a steering input, with driving force for rotating the input shaft and the output shaft relative to each other, and locking means capable of placing the input shaft and the output shaft in a locked state in which the input shaft and the output shaft are unable to rotate relative to each other, comprising:
   first control means for controlling the locking means so that the input shaft and the output shaft are placed in the locked state when a given lock condition based on a load condition of the driving force providing means is satisfied;
   acquiring means for acquiring an actual steering angle index value of a rotational angle of the output shaft corresponding to an actual steering angle of the vehicle; and
   second control means for controlling the locking means so as to release the locked state if the acquired actual steering angle index value corresponding to the actual steering angle of the vehicle is equal to or smaller than a lock release threshold value that prevents the input shaft and the output shaft from being immediately brought back into the locked state based on the load condition of the driving force providing means.

2. The steering control system according to claim 1, wherein the acquiring means acquires the actual steering angle of the vehicle as the actual steering angle index value.

3. The steering control system according to claim 1, wherein the acquiring means acquires a lateral acceleration of the vehicle as the actual steering angle index value.

4. The steering control system according to claim 1, wherein the acquiring means acquires the actual steering angle of the vehicle and a lateral acceleration of the vehicle as the actual steering angle index value.

5. The steering control system according to claim 1, further comprising:
   setting means for setting a threshold value of the actual steering angle index value, based on which it is determined whether the actual steering angle is within a given lock release region; and
   determining means for determining whether the actual steering angle is within the lock release region, based on the acquired actual steering angle index value and the set threshold value,
   wherein the second control means releases the locked state when the determining means determines that the actual steering angle is within the lock release region.

6. The steering control system according to claim 5, wherein the setting means sets the threshold value in accordance with a vehicle speed.

7. The steering control system according to claim 6, wherein the setting means sets the threshold value so that the lock release region becomes smaller as the vehicle speed decreases, when the vehicle speed is in a given low-speed range.

8. The steering control system according to claim 6, wherein the setting means sets the threshold value so that the lock release region becomes larger as the vehicle speed decreases, when the vehicle speed is in a given high-speed range.

9. The steering control system according to claim 6, wherein the setting means sets the threshold value so that the lock release region is constant when the vehicle speed is equal to or higher than an upper limit of a given low-speed range and is lower than a lower limit of a given high-speed range.

10. The steering control system according to claim 5, wherein the vehicle is further provided with assist steering force providing means capable of providing assist steering force to the output shaft.

11. The steering control system according to claim 10, wherein:
   the assist steering force providing means includes a motor capable of providing the assist steering force in accordance with driving current that is set within a range whose upper limit is set according to a thermal load; and
   the setting means sets the threshold value so that the lock release region becomes smaller as the upper limit of the range of the driving current decreases.

12. A steering control system of a vehicle, which includes a driving force providing mechanism capable of providing at least one of an input shaft and an output shaft that are involved in transmission of a steering input, with driving force for rotating the input shaft and the output shaft relative to each other, and a lock mechanism capable of placing the input shaft and the output shaft in a locked state in which the input shaft and the output shaft are unable to rotate relative to each other, comprising:
   a first controller that controls the lock mechanism so that the input shaft and the output shaft are placed in the locked state when a given lock condition based on a load condition of the driving force providing mechanism is satisfied;
   an acquiring unit that acquires an actual steering angle index value of a rotational angle of the output shaft corresponding to an actual steering angle of the vehicle; and
   a second controlled that controls the lock mechanism so as to release the locked state if the acquired actual steering angle index value corresponding to the actual steering angle of the vehicle is equal to or smaller than a lock release threshold value that prevents the input shaft and the output shaft from being immediately brought back into the locked state based on the load condition of the driving force providing means.

13. A steering control method of a vehicle including a driving force providing mechanism capable of providing at least one of an input shaft and an output shaft that are involved in transmission of a steering input, with driving force for rotating the input shaft and the output shaft relative to each other, and a lock mechanism capable of placing the input shaft and the output shaft in a locked state in which the input shaft and the output shaft are unable to rotate relative to each other, comprising:
   controlling the lock mechanism so that the input shaft and the output shaft are placed in the locked state when a given lock condition based on a load condition of the driving force providing mechanism is satisfied;
   acquiring an actual steering angle index value of a rotational angle of the output shaft corresponding to an actual steering angle of the vehicle; and
   controlling the lock mechanism so as to release the locked state if the acquired actual steering angle index value corresponding to the actual steering angle of the vehicle is equal to or smaller than a lock release threshold value that prevents the input shaft and the output shaft from being immediately brought back into the locked state based on the load condition of the driving force providing means.

* * * * *